(12) United States Patent
Dumitras et al.

(10) Patent No.: US 9,043,922 B1
(45) Date of Patent: May 26, 2015

(54) SYSTEMS AND METHODS FOR DETERMINING MALICIOUS-ATTACK EXPOSURE LEVELS BASED ON FIELD-DATA ANALYSIS

(71) Applicant: Symantec Corporation, Mountain View, CA (US)

(72) Inventors: Tudor Dumitras, Bethesda, MD (US); Petros Efstathopoulos, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 126 days.

(21) Appl. No.: 13/866,724

(22) Filed: Apr. 19, 2013

(51) Int. Cl.
*G06F 21/00* (2013.01)
*G06F 21/57* (2013.01)

(52) U.S. Cl.
CPC .................... *G06F 21/577* (2013.01)

(58) Field of Classification Search
CPC .............. G06F 21/577; H04L 63/1416; H04L 63/1433; H04L 63/20; H04L 63/1408
USPC .......................................................... 726/25
See application file for complete search history.

(56) References Cited

U.S. PATENT DOCUMENTS

| 7,730,040 | B2 | 6/2010 | Reasor et al. | |
| 7,966,278 | B1 * | 6/2011 | Satish | 706/52 |
| 8,255,902 | B1 | 8/2012 | Satish | |
| 8,392,996 | B2 * | 3/2013 | Oliver et al. | 726/25 |
| 2004/0045012 | A1 | 3/2004 | Doraisamy | |
| 2004/0230967 | A1 | 11/2004 | Yuknewicz et al. | |
| 2005/0283622 | A1 * | 12/2005 | Hall et al. | 713/190 |
| 2007/0016953 | A1 * | 1/2007 | Morris et al. | 726/24 |
| 2009/0126023 | A1 * | 5/2009 | Yun et al. | 726/25 |
| 2009/0133126 | A1 * | 5/2009 | Jang et al. | 726/24 |
| 2009/0172818 | A1 * | 7/2009 | Sutherland et al. | 726/25 |
| 2010/0115621 | A1 * | 5/2010 | Staniford et al. | 726/25 |
| 2010/0275263 | A1 * | 10/2010 | Bennett et al. | 726/25 |
| 2012/0102570 | A1 * | 4/2012 | Herz | 726/25 |
| 2012/0144494 | A1 * | 6/2012 | Cole et al. | 726/25 |
| 2013/0074186 | A1 | 3/2013 | Muttik | |
| 2013/0219503 | A1 * | 8/2013 | Amnon et al. | 726/25 |
| 2013/0312101 | A1 * | 11/2013 | Lotem et al. | 726/25 |

OTHER PUBLICATIONS

Fonseca et al, "Vulnerability and attack injection for web application", 2009, pp. 93-102.*

(Continued)

*Primary Examiner* — Yonas Bayou
(74) *Attorney, Agent, or Firm* — ALG Intellectual Property, LLC (57) ABSTRACT

A computer-implemented method for determining malicious-attack exposure levels based on field-data analysis may include (1) receiving a plurality of attack reports from a plurality of computing systems, wherein at least one attack report includes an identifier of a software component of a computing system within the plurality of computing systems from which the attack report was received and an indication that a malicious attack was detected at the computing system, (2) determining a number of attack reports within the plurality of attack reports that identify the software component, (3) analyzing the plurality of attack reports to determine, based at least in part on the number of attack reports, a level of exposure to malicious attacks of the software component, and (4) making, based at least in part on the level of exposure, a security determination related to the software component. Various other methods, systems, and computer-readable media are also disclosed.

20 Claims, 6 Drawing Sheets

(56) References Cited

OTHER PUBLICATIONS

Liu Jing, "Risk evaluation process model of information security", 2009, pp. 321-324.*

Symantec; Data Sharing—Worldwide Intelligence Network Environment; http://www.symantec.com/about/profile/universityresearch/sharing.jsp; as accessed on Jan. 29, 2013.

Tudor Dumitras et al.; Toward a Standard Benchmark for Computer Security Research: The Worldwide Intelligence Network Environment (WINE); In EuroSys Badgers Workshop, Salzburg, Austria, Apr. 10, 2011 (available at http://users.ece.cmu.edu/~tdumitra/public_documents/dumitras11wine.pdf).

Tudor Dumitras et al.; Ask WINE: Are We Safer Today? Evaluating Operating System Security through Big Data Analysis; In USENIX Workshop on Large-Scale Exploits and Emerging Threats (LEET), Apr. 24, 2012.

Piyush Sharma et al.; Systems and Methods for Determining Potential Impacts of Applications on the Security of Computing Systems; U.S. Appl. No. 13/838,613, filed Mar. 15, 2013.

Sourabh Satish; Systems and Methods for Determining and Quantifying the Impact of an Application on the Health of a System; U.S. Appl. No. 13/558,570, filed Jul. 26, 2012.

* cited by examiner

SYSTEMS AND METHODS FOR DETERMINING MALICIOUS-ATTACK EXPOSURE LEVELS BASED ON FIELD-DATA ANALYSIS

BACKGROUND

Consumers and businesses increasingly rely on computing systems (e.g., smartphones, tablets, laptops, etc.) to store and manage sensitive data. Consequently, malicious programmers seem to continuously increase their efforts to gain illegitimate control and access to these computing systems through the use of viruses, Trojan horses, worms, and other programs meant to compromise computing systems and data belonging to other people.

The level to which a computing system is exposed to malicious attacks may be based on the level to which software components (e.g., the operating system and applications) running on the computing system are exposed to malicious attacks. Typical methods for determining the level to which a software component is exposed to malicious attacks may include a direct examination of how the software component is configured. For example, the level of exposure to malicious attacks of a software component may be estimated through a direct examination of the software component's source code and/or default configuration (e.g., the number of running services or open ports of the software component). Unfortunately, estimating malicious-attack exposure levels through direct examination may inadequately estimate real-world malicious-attack exposure levels. Accordingly, the instant disclosure addresses a need for additional and improved systems and methods for determining malicious-attack exposure levels based on field-data analysis.

SUMMARY

As will be described in greater detail below, the instant disclosure generally relates to systems and methods for determining malicious-attack exposure levels based on field-data analysis. In one example, a computer-implemented method for determining malicious-attack exposure levels based on field-data analysis may include (1) receiving a plurality of attack reports from a plurality of computing systems, wherein at least one attack report within the plurality of attack reports includes an identifier of a software component of a computing system within the plurality of computing systems from which the attack report was received and an indication that a malicious attack was detected at the computing system from which the attack report was received, (2) determining a number of attack reports within the plurality of attack reports that identify the software component, (3) analyzing the plurality of attack reports to determine, based at least in part on the number of attack reports within the plurality of attack reports that identify the software component, a level of exposure to malicious attacks of the software component, and (4) making, based at least in part on the level of exposure to malicious attacks of the software component, a security determination related to the software component.

In some examples, the step of making the security determination related to the software component may include identifying an additional computing system on which the software component is installed and determining, based at least in part on the level of exposure to malicious attacks of the software component, a level of exposure to malicious attacks of the additional computing system.

In other examples, the step of making the security determination related to the software component may include identifying a potential malicious attack at at least one additional computing system on which the software component is installed and determining, based at least in part on the level of exposure to malicious attacks of the software component, a level of threat of the potential malicious attack.

In certain examples, the computer-implemented method may further include correlating at least one property of the software component with the level of exposure to malicious attacks of the software component and making, based at least in part on correlating the property of the software component with the level of exposure to malicious attacks of the software component, a security determination related to the property of the software component.

In some examples, the step of making a security determination related to the property of the software component may include identifying an additional software component with the property of the software component and estimating, based at least in part on correlating the property of the software component with the level of exposure to malicious attacks of the software component, a level of exposure to malicious attacks of the additional software component.

In at least one example, the step of determining the number of attack reports within the plurality of attack reports that identify the software component may include determining a number of attack reports within the plurality of attack reports that identify the software component and indicate that a malicious attack to which the software component is known to be vulnerable was detected, and the step of analyzing the plurality of attack reports to determine the level of exposure to malicious attacks of the software component may be based at least in part on the number of attack reports within the plurality of attack reports that identify the software component and indicate that the malicious attack to which the software component is known to be vulnerable was detected.

In other examples, the step of determining the number of attack reports within the plurality of attack reports that identify the software component may include determining a number of attack reports within the plurality of attack reports that identify the software component and indicate that a network-based malicious attack was detected, and the step of analyzing the plurality of attack reports to determine the level of exposure to malicious attacks of the software component may include analyzing the plurality of attack reports to determine, based at least in part on the number of attack reports within the plurality of attack reports that identify the software component and indicate that a network-based malicious attack was detected, a level of exposure to network-based malicious attacks of the software component.

In some examples, the step of determining the number of attack reports within the plurality of attack reports that identify the software component may include determining a number of attack reports within the plurality of attack reports that identify the software component and indicate that a host-based malicious attack was detected, and the step of analyzing the plurality of attack reports to determine the level of exposure to malicious attacks of the software component may include analyzing the plurality of attack reports to determine, based at least in part on the number of attack reports within the plurality of attack reports that identify the software component and indicate that a host-based malicious attack was detected, a level of exposure to host-based malicious attacks of the software component.

In certain examples, the computer-implemented method may further include normalizing, prior to analyzing the plurality of attack reports to determine the level of exposure to malicious attacks of the software component, the number of attack reports within the plurality of attack reports that identify the software component.

In at least one example, the software component of the computing system may include an operating system installed on the computing system and/or an application installed on the computing system.

In one embodiment, a system for implementing the above-described method may include (1) a receiving module programmed to receive a plurality of attack reports from a plurality of computing systems, wherein at least one attack report within the plurality of attack reports includes an identifier of a software component of a computing system within the plurality of computing systems from which the attack report was received and an indication that a malicious attack was detected at the computing system from which the attack report was received, (2) an analyzing module programmed to determine the number of attack reports within the plurality of attack reports that identify the software component and analyze the plurality of attack reports to determine, based at least in part on the number of attack reports within the plurality of attack reports that identify the software component, a level of exposure to malicious attacks of the software component, (3) a security module programmed to make, based at least in part on the level of exposure to malicious attacks of the software component, a security determination related to the software component, and (4) at least one processor configured to execute the receiving module, the analyzing module, and the security module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive a plurality of attack reports from a plurality of computing systems, wherein at least one attack report within the plurality of attack reports includes an identifier of a software component of a computing system within the plurality of computing systems from which the attack report was received and an indication that a malicious attack was detected at the computing system from which the attack report was received, (2) determine a number of attack reports within the plurality of attack reports that identify the software component, (3) analyze the plurality of attack reports to determine, based at least in part on the number of attack reports within the plurality of attack reports that identify the software component, a level of exposure to malicious attacks of the software component, and (4) make, based at least in part on the level of exposure to malicious attacks of the software component, a security determination related to the software component.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining malicious-attack exposure levels based on field-data analysis. As will be explained in greater detail below, by gathering reports of actual malicious attacks observed in the field (e.g., at end-user computing systems that are in active use and are actively targeted by malicious attacks), the systems and methods described herein may determine how susceptible software components (e.g., operating systems and application) are to malicious attacks. Furthermore, in some examples, by determining how susceptible software components are to malicious attacks, these systems and methods may (1) provide security-threat researchers and end-users with a greater understanding of the growth and evolution of security threats that attack end-user computing systems in the field and (2) improve malicious-attack detections systems that provide early-detection of and response to unknown malicious attacks.

Embodiments of the instant disclosure may also provide various other advantages and features, as discussed in greater detail below.

Figure 1:
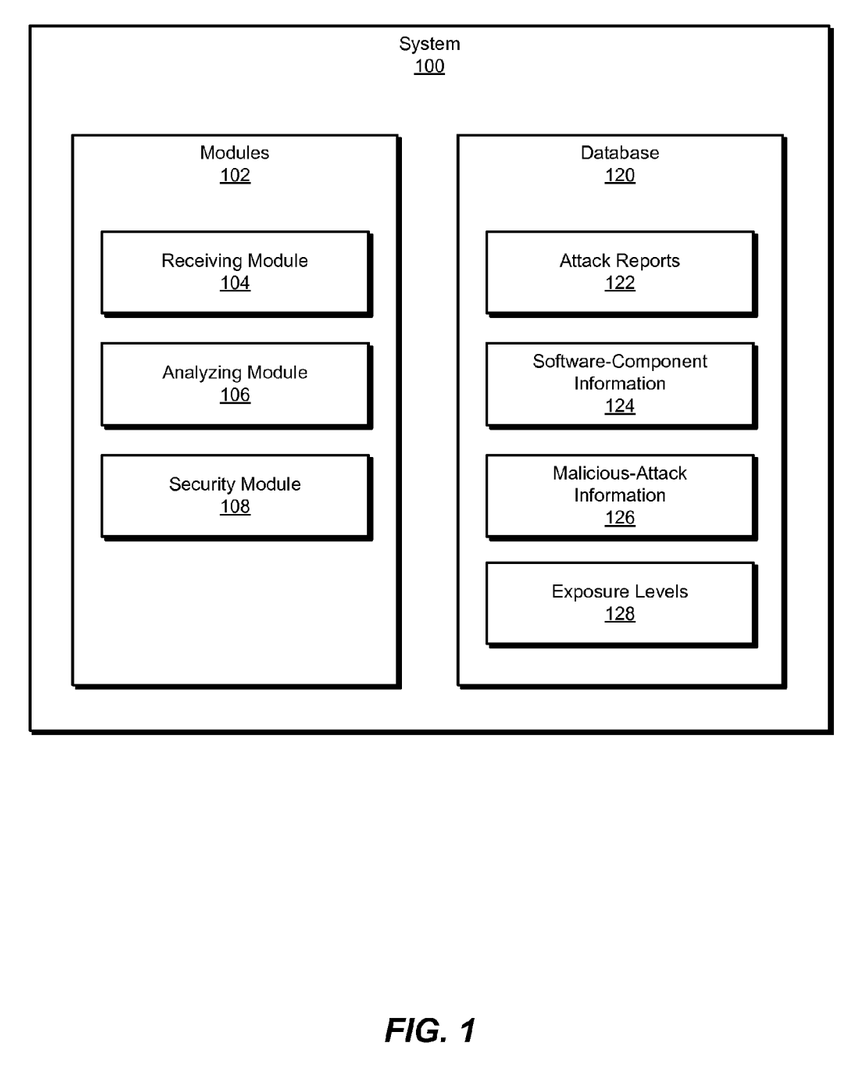
FIG. 1 is a block diagram of an exemplary system for determining malicious-attack exposure levels based on field-data analysis.
Figure 2:
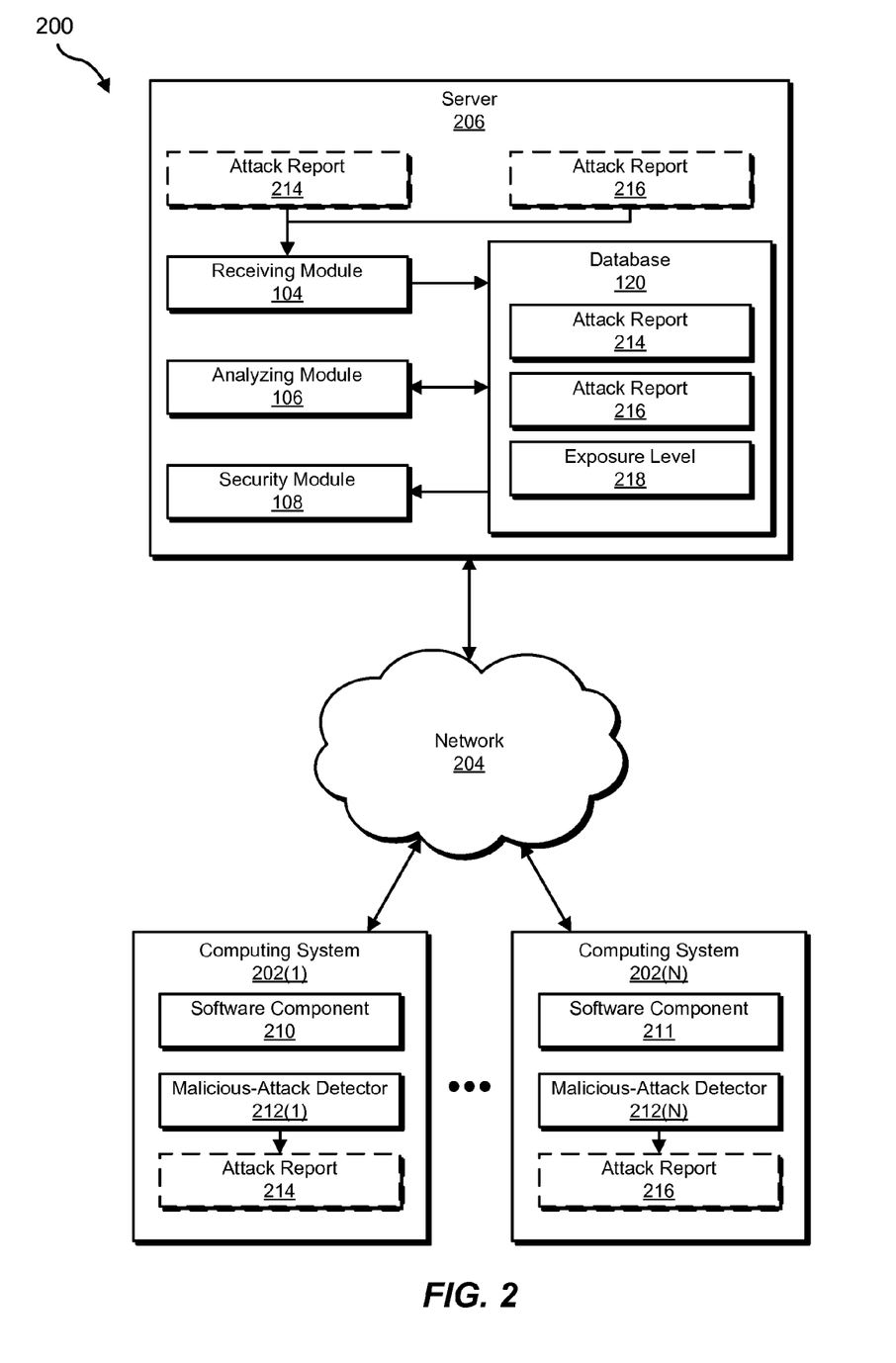
FIG. 2 is a block diagram of an exemplary system for determining malicious-attack exposure levels based on field-data analysis.
Figure 3:
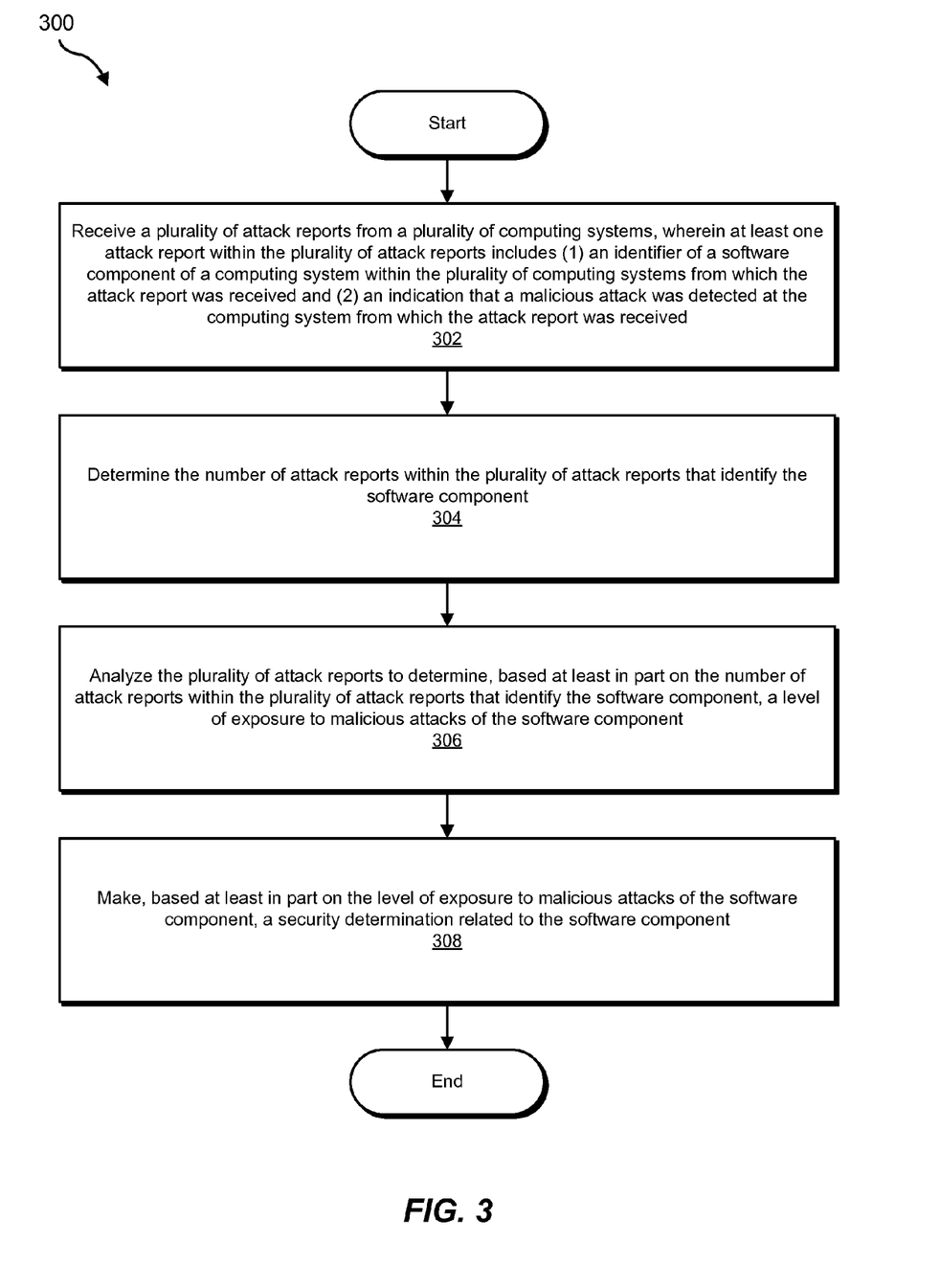
FIG. 3 is a flow diagram of an exemplary method for determining malicious-attack exposure levels based on field-data analysis.
Figure 4:
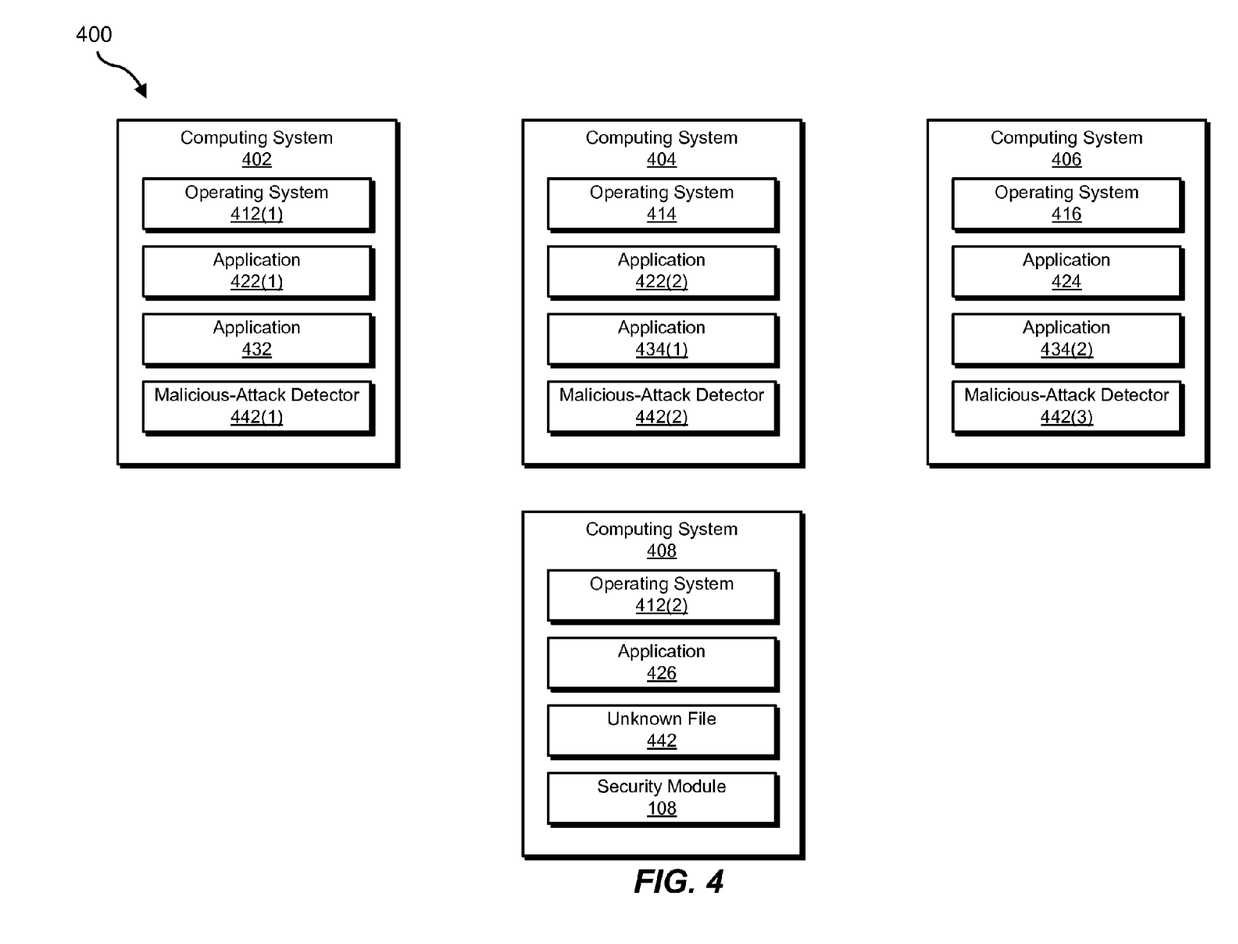
FIG. 4 is a block diagram of an exemplary system for determining malicious-attack exposure levels based on field-data analysis.

The following will provide, with reference to FIGS. 1, 2, and 4, detailed descriptions of exemplary systems for determining malicious-attack exposure levels based on field-data analysis. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for determining malicious-attack exposure levels based on field-data analysis. As illustrated in this figure, exemplary system 100 may include one or more modules 102 for performing one or more tasks. For example, and as will be explained in greater detail below, exemplary system 100 may include a receiving module 104 programmed to receive a plurality of attack reports from a plurality of computing systems, wherein at least one attack report within the plurality of attack reports includes an identifier of a software component of a computing system within the plurality of computing systems from which the attack report was received and an indication that a malicious attack was detected at the computing system from which the attack report was received. Exemplary system 100 may also include an analyzing module 106 programmed to determine the number of attack reports within the plurality of attack reports that identify the software component and analyze the plurality of attack reports to determine, based at least in part on the number of attack reports within the plurality of attack reports that identify the software component, a level of exposure to malicious attacks of the software component.

In addition, and as will be described in greater detail below, exemplary system 100 may include a security module 108 programmed to make, based at least in part on the level of exposure to malicious attacks of the software component, a security determination related to the software component. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIGS. 2 and 4 (e.g., computing systems 202(1)-(N), server 206, and/or computing systems 402-408), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include attack reports 122 for storing one or more attack reports, software-component information 124 for storing information about one or more software components, malicious-attack information 126 for storing information about one or more malicious attacks, and exposure levels 128 for storing information about one or more malicious-attack exposure levels.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing systems 202(1)-(N) in communication with a server 206 via a network 204. Computing systems 202(1)-(N) may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing systems 202(1)-(N) and/or server 206, facilitate computing systems 202(1)-(N) and/or server 206 in determining malicious-attack exposure levels based on field-data analysis. For example, and as will be described in greater detail below, one or more of modules 102 may cause computing systems 202(1)-(N) and/or server 206 to (1) receive a plurality of attack reports (e.g., attack reports 214 and 216) from a plurality of computing systems (e.g., computing systems 202(1)-(N)), wherein at least one attack report (e.g., attack report 214) within the plurality of attack reports includes an identifier of a software component (e.g., an identifier of software component 210) of a computing system (e.g., computing system 202(1)) within the plurality of computing systems from which the attack report was received and an indication that a malicious attack (e.g., a host-based malicious attack or a network-based malicious attack) was detected at the computing system from which the attack report was received, (2) determine a number of attack reports within the plurality of attack reports that identify the software component, (3) analyze the plurality of attack reports to determine, based at least in part on the number of attack reports within the plurality of attack reports that identify the software component, a level of exposure to malicious attacks of the software component (e.g., exposure level 218), and (4) make, based at least in part on the level of exposure to malicious attacks of the software component, a security determination related to the software component.

Computing systems 202(1)-(N) generally represent any type or form of computing device capable of reading computer-executable instructions. Examples of computing systems 202(1)-(N) include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device. In some examples, computing systems 202(1)-(N) may include software components and malicious-attack detectors. For example as shown in FIG. 2, computing system 202(1) may include a software component 210 and a malicious-attack detector 212(1), and computing system 202(N) may include a software component 211 and a malicious-attack detector 212(N).

Software components 210 and 211 generally represent software capable of being executed by computing systems 202(1)-(N). Examples of software components include, without limitation, operating systems and applications. Malicious-attack detectors 212(1)-(N) generally represent any system (e.g., hardware or software) capable of detecting malicious attacks. Examples of malicious-attack detectors include, without limitation, antivirus detectors, intrusion detection systems (IDS), and/or intrusion prevention systems (IPS).

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing systems 202(1)-(N) and server 206.

FIG. 3 is a flow diagram of an exemplary computer-implemented method 300 for determining malicious-attack exposure levels based on field-data analysis. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, computing system 510 in FIG. 5, and/or portions of exemplary network architecture 600 in FIG. 6.

As illustrated in FIG. 3, at step 302 one or more of the systems described herein may receive a plurality of attack reports from a plurality of computing systems, wherein at least one attack report within the plurality of attack reports may include (1) an identifier of a software component of a computing system within the plurality of computing systems from which the attack report was received and (2) an indication that a malicious attack was detected at the computing system from which the attack report was received. For example, at step 302 receiving module 104 may, as part of server 206 in FIG. 2, receive a plurality of attack reports (e.g., attack reports 214 and 216) from a plurality of computing systems (e.g., computing systems 202(1)-(N)). In one example, attack report 214 may include an identifier of software component 210 and an indication that a malicious attack was detected at computing system 202(1), and attack report 216 may include an identifier of software component 211 and an indication that a malicious attack was detected at computing system 202(N). Using FIG. 4 as an additional example, receiving module 104 may receive a plurality of attack reports from computing systems 402-406 as malicious-attack detectors 442(1)-(3) report malicious attacks detected at computing systems 402-406.

As used herein, the term "attack report" generally refers to any malicious-attack telemetry generated by malicious-attack detection systems. For example, attack reports may include antivirus telemetry generated by an antivirus application and/or intrusion-detection telemetry generated by an intrusion detection system. In at least one example, attack reports may represent data like that collected by SYMANTEC security products. For example, the term "attack report" may refer to data accessible through SYMANTEC's WORLDWIDE INTELLIGENCE NETWORK ENVIRONMENT (WINE).

An attack report may include (1) an identifier of at least one software component of the computing system on which the attack report is generated and (2) an indication that a malicious attack was detected at the computing system. As used herein, the term "software component" may generally refer to any software capable of executing on a computing system. Examples of software components may include, without limitation, operating systems and applications. The term "application," as used herein, may refer to any application, application package, program, driver, module, script, daemon, software update, and/or process that may execute on a computing system. The term "malicious attack," as used herein, may generally refer to any cyber-threat attack. Examples of malicious attacks may include, without limitation, host-based attacks (e.g., cyber-threat attacks that cause computing systems' users to download and/or run malicious files on computing systems) and/or network-based attacks (e.g., cyber-threat attacks that use known network-based exploits and attack vectors to execute malicious files on computing systems).

Identifiers of software components may include any information that may be used to identify the software components. For example, identifiers of software components may include software-component names (e.g., "Windows XP", "Microsoft Word 2010", or "Mac OS X 10.7"), software-component version numbers (e.g., "5.1", "14", or "10.7.5"), software-component build numbers, software-component installation ages, and/or any configuration information associated with software components (e.g., enabled and/or disabled features). In at least one example, the presence of an identifier of a software component within an attack report may indicate that the software component would likely have been compromised by a malicious attack had the malicious attack not been detected.

Indications that a malicious attack has been detected at a computing system may include any information that indicates that a malicious attack was directed at the computing system or at a software component of the computing system and/or any information that identifies the malicious attack (e.g., an attack signature). In at least one example, the existence of an attack report may indicate that a malicious attack was detected at the computing system on which the attack report was generated. In some examples, an attack report may indicate that a known malicious attack was detected at and prevented from infecting a computing system. For example, an attack report may indicate that a malicious attack was detected and blocked after it bypassed a software component's defenses (e.g., an operating system's defenses). Because attack reports may identify instances wherein malicious attacks would have likely infected computing systems had the malicious attacks not been blocked, the existence of attack reports that identify a particular software components may be a good indicator of how exposed the software component is to malicious attacks.

Returning to FIG. 3, the systems described herein may perform step 302 in any suitable manner. For example, malicious-attack detectors 212(1)-(N) in FIG. 2 may be configured to (1) detect malicious attacks at computing systems 202(1)-(N), (2) generate attack reports when malicious attacks are detected, and (3) transmit attack reports to server 206. In this example, receiving module 104 may, as part of server 206, simply collect any attack reports generated by malicious-attack detectors 212(1)-(N). In some examples, receiving module 104 may store received attack reports in attack reports 122 in database 120. For example, as shown in FIG. 2, receiving module 104 may receive attack reports 214 and 216 from computing systems 202(1) and 202(N) and may store attack reports 214 and 216 in database 120.

FIG. 4 is a block diagram of an exemplary system 400 for determining malicious-attack exposure levels based on field-data analysis. As illustrated in FIG. 4, exemplary system 400 may include computing systems 402-408. Computing systems 402-406 may represent a fraction of a plurality of computing systems within exemplary system 400 that are configured to report malicious attacks, and computing system 408 may represent an unknown computing system (e.g., a computing system on which security module 108 has just been installed). As shown, computing systems 402-408 may include various software components. For example, computing system 402 may include operating system 412(1), application 422(1), and application 432; computing system 404 may include operating system 414, application 422(2), and application 434(1); computing system 406 may include operating system 416, application 424, and application 434(2); and computing system 408 may include operating system 412(2) and application 426. In this example, operating systems 412(1) and 412(2) may represent instances of the same operating system, applications 422(1) and 422(2) may represent instances of the same application, and applications 434(1) and 434(2) may represent instances of the same application.

Computing systems 402-406 may also include malicious-attack detectors 442(1)-(3) configured to report malicious attacks detected at computing systems 402-406. In this example, any attack report received by receiving module 104 from computing system 402 may include the identifiers of one or more of operating system 412(1), application 422(1), and application 432; any attack report received by receiving module 104 from computing system 404 may include the identifiers of one or more of operating system 414, application 422(2), and application 434(1); and any attack report received by receiving module 104 from computing system 406 may include the identifiers of one or more of operating system 416, application 424, and application 434(2).

Returning to FIG. 3 at step 304, one or more of the systems described herein may determine the number of attack reports within the plurality of attack reports that identify the software component. For example, at step 304 analyzing module 106 may, as part of server 206 in FIG. 2, determine the number of attack reports within attack reports 122 that identify software component 210 and/or the number of attack reports within attack reports 122 that identify software component 211.

Using FIG. 4 as an additional example, analyzing module 106 may determine, from among the attack reports received from the computing systems within system 400, the number of attack reports that identify operating system 412, the number of attack reports that identify operating system 414, the number of attack reports that identify operating system 416, the number of attack reports that identify application 422, the number of attack reports that identify application 424, the number of attack reports that identify application 432, and the number of attack reports that identify application 434.

The systems described herein may perform step 304 in any suitable manner. In one example, analyzing module 106 may determine, for at least one software component hosted on computing systems 202(1)-(N), the number of attack reports that identify the software component. Because attack reports may represent the detection of malicious attacks that would likely have infected a computing system had the malicious attacks not been blocked, the number of attack reports that identify a particular software component may be a good indicator of how exposed the software component is to malicious attacks. For this reason, the number of attack reports that identify a software component may represent a measurement of the software component's level of exposure to malicious attacks.

In some examples, analyzing module 106 may count only attack reports that identify a software component and that identify a malicious attack to which the software component is known to be vulnerable. Analyzing module 106 may identify which malicious attacks a software component is known to be vulnerable using information contained within software-component information 124 and/or malicious-attack information 126. In many instances, the number of attack reports that identify a software component and a malicious attack to which the software component is known to be vulnerable may better reflect the software component's level of exposure to malicious attacks.

In some examples, analyzing module 106 may also count the number of attack reports that identify a software component and indicate that a host-based malicious attack was detected or indicate that a network-based malicious attack was detected. The number of attack reports that identify a software component and indicate that a host-based malicious attack was detected may indicate the software component's level of exposure to host-based malicious attacks, and the number of attack reports that identify a software component and indicate that a network-based malicious attack was detected may indicate the software component's level of exposure to network-based malicious attacks.

In certain examples, analyzing module 106 may normalize the number of attack reports that identify a software component so that the number of attack reports that identify the software component may be meaningfully compared with the number of attack reports that identify other software components. In some examples, analyzing module 106 may normalize the number of attack reports that identify a software component based on the number of computing systems that host the software component, the average length of time during which the software component was observed to be running, and/or the number of distinct malicious attacks detected alongside the software component.

In some examples, analyzing module 106 may count the number of attack reports that were received during specific time periods (e.g., a specific month, week, or day). For example, analyzing module 106 may determine, for at least one time period during which attack reports were received and for at least one software component hosted on computing systems 202(1)-(N), the number of attack reports that identify the software component and that were received during the time period. In at least one example, analyzing module 106 may count the number of attack reports that were received before a software component has been updated and the number of attack reports that were received after the software component has been updated. In some examples, a comparison of the number of attack reports that were received before a software component has been updated with the number of attack reports that were received after the software component has been updated may indicate whether updating the software component increased or decreased the software component's level of exposure to malicious attacks.

At step 306, one or more of the systems described herein may analyze the plurality of attack reports to determine, based at least in part on the number of attack reports within the plurality of attack reports that identify the software component, a level of exposure to malicious attacks of the software component. For example, at step 306 analyzing module 106 may, as part of server 206 in FIG. 2, analyze one or more of attack reports 122 to determine, based at least in part on the number of attack reports within attack reports 122 that identify software component 210, a level of exposure to malicious attacks of software component 210.

As used herein, the terms "level of exposure to malicious attacks" and "malicious-attack exposure level" may generally refer to any security metric that indicates a software component's susceptibility to malicious attacks and/or any security metric that indicates the effectiveness of malicious attacks directed towards a software component. In one example, a level of exposure to malicious attacks may reflect the portion (e.g., the attack vectors) of a software component's attack surface that is actually attacked in the field. In another example, a malicious-attack exposure level may reflect the portion of a software component's vulnerabilities that is actually attacked in the field. Generally, the malicious-attack exposure levels of two or more software components may be compared to determine the relative susceptibility to malicious attacks of the two or more software components.

The systems described herein may perform step 306 in any suitable manner. In one example, analyzing module 106 may determine the level of exposure to malicious attacks of a software component based solely on the number of attack reports that identify the software component (e.g., as determined above as part of step 304). For example, analyzing module 106 may determine that the level of exposure to malicious attacks of a software component is equal or proportional to the number of attack reports that identify the software component. In other examples, analyzing module 106 may determine that the level of exposure to malicious attacks of a software component equal or proportional to the number of attack reports that identify the software component and that identify a malicious attack to which the software component is known to be vulnerable.

As mentioned above, because attack reports may represent the detection of malicious attacks that would likely have infected a computing system had the malicious attacks not been blocked, the number of attack reports that identify a particular software component may be a good indicator of how exposed the software component is to malicious attacks. For this reason, the number of attack reports that identify a software component may represent a measurement of the software component's level of exposure to malicious attacks.

In some examples, analyzing module 106 may also determine a software component's level of exposure to certain types of malicious attacks. For example, analyzing module 106 may determine that a software component's level of exposure to host-based malicious attacks is equal or proportional to the number of attack reports that identify the software component and that indicate that a host-based malicious attack was detected and/or that a software component's level of exposure to network-based malicious attacks is equal or proportional to the number of attack reports that identify the software component and that indicate that a network-based malicious attack was detected.

In some examples, analyzing module 106 may also analyze the plurality of attack reports to determine whether certain properties of a software component contribute to the software component's level of exposure to malicious attacks. In one example, analyzing module 106 may determine whether certain properties of a software component contribute to the software component's level of exposure to malicious attacks by correlating the properties of the software component with the level of exposure to malicious attacks of the software component.

Examples of the properties of a software component that analyzing module 106 may correlate with the software component's malicious-attack exposure level may include, without limitation, the software component's installation age (e.g., the average length of time that the software component has been installed), the software component's version age (e.g., the length of time since the version of the software component was released), the software component's deployment size (e.g., the number of active computing systems running the software component), the software component's security technologies, the software component's known vulnerabilities, and/or the software component's attack surface.

In addition to software-component properties, in at least one example, analyzing module 106 may correlate properties of the computing systems on which the software component runs with the level of exposure of the software component. For example, analyzing module 106 may correlate the number of times a computing system crashes with the level of exposure to malicious attacks of a software component running on the computing system.

At step 308, one or more of the systems described herein may make, based at least in part on the level of exposure to malicious attacks of the software component, a security determination related to the software component. For example, at step 308 security module 108 may, as part of one or more of computing systems 202(1)-(N) and/or server 206 in FIG. 2, make a security determination related to software component 210 based at least in part on exposure level 218. Using FIG. 4 as an additional example, security module 108 may, as part of computing system 408, make a security determination related to operating system 412(2). Upon completion of step 308, exemplary method 300 in FIG. 3 may terminate.

The systems described herein may perform step 308 in any suitable manner. In one example, security module 108 may use malicious-attack exposure levels of software components to determine the exposure level to malicious attacks of a computing system. Using FIG. 4 as an example, security module 108 may, as part of computing system 408, determine a level of exposure to malicious attacks of computing system 408 based at least in part on the level of exposure to malicious attacks of operating system 412(2).

In some examples, security module 108 may, as part of a malicious-attack detection engine and/or a reputation engine, use malicious-attack exposure levels to improve determinations of the malicious-attack detection engine and/or the reputation engine. For example, security module 108 may, after identifying a potential malicious attack at a computing system on which a software component with a known malicious-attack exposure level is installed, determine a level of threat of the potential malicious attack based at least in part on the software component's known malicious-attack exposure level. Using FIG. 4 as an example, security module 108 may identify unknown file 442 on computing system 408 and may determine the level of threat of unknown file 442 based at least in part on the malicious-attack exposure level of operating system 412(2). For example, if the malicious-attack exposure level of operating system 412(2) is relatively high, security module 108 may decide that unknown file 442 is more likely to be a security threat. On the other hand, if the malicious-attack exposure level of operating system 412(2) is relatively low, security module 108 may decide that unknown file 442 is less likely to be a security threat.

In certain examples, security module 108 may estimate or predict malicious-attack exposure levels of unknown software components based on correlations between software-component properties and malicious-attack exposure levels. Using FIG. 4 as an example, security module 108 may, as part of computing system 408, identify application 426 (e.g., an application whose level of exposure to malicious attacks in unknown) and may estimate the level of exposure to malicious attacks of application 426 based on the known malicious-attack exposure levels of other software components with similar properties. In one example, security module 108 may determine that application 426 has been deployed to a large number of computing systems and that the average installation age of application 426 across the large number of computing systems is relatively high. If greater deployment sizes and longer installation ages have been correlated with higher levels of exposure to malicious attacks, security module 108 may decide that application 426 is likely to have a relatively higher level of exposure to malicious attacks.

In some examples, security module 108 may make security determinations related to a software component based on correlations between the software component's properties and its malicious-attack exposure level. For example, analyzing module 106 may use correlations between a software component's security technologies and its level of exposure to malicious attacks to determine the effectiveness of the software component's security technologies. In another example, analyzing module 106 may use correlations between the installation age of a particular version of a software component and its malicious-attack exposure level to determine that the longer this particular version of the software component is installed on a computing system the more malicious-attack attacks are detected on the computing system.

In at least one example, security module 108 may use correlations between a software component's properties and its malicious-attack exposure level as new features to train a machine-learning-based detection system to better detect and classify unknown threats and attacks.

In at least one example, security module 108 may use correlations between a software component's known attack surface and/or vulnerabilities and its level of exposure to malicious attacks to determine the number and importance of attack vectors provided by the software component and/or the number and importance of the software component's vulnerabilities.

As explained above, by gathering reports of actual malicious attacks observed in the field (e.g., at end-user computing systems that are in active use and are actively targeted by malicious attacks), the systems and methods described herein may determine how susceptible software components (e.g., operating systems and application) are to malicious attacks. Furthermore, in some examples, by determining how susceptible software components are to malicious attacks, these systems and methods may (1) provide security-threat researchers with a greater understanding of the growth and evolution of security threats that attack end-user computing systems in the field and (2) improve malicious-attack detections systems that provide early-detection of and response to unknown malicious attacks.

For example, by (1) gathering millions of attack reports from millions of end-user computing systems, (2) counting, for each unique software component running on the end-user computing systems, the number of attack reports that identify the software component, and (3) analyzing the plurality of attack reports to determine, based at least in part on the number of attack reports within the plurality of attack reports that identify the software component, a level of exposure to malicious attacks of each unique software component, the systems and methods described herein may (1) provide security-threat researchers with a greater understanding of the growth and evolution of security threats that attack end-user computing systems in the field and (2) improve malicious-attack detections systems that provide early-detection of and response to unknown malicious attacks.

Figure 5:
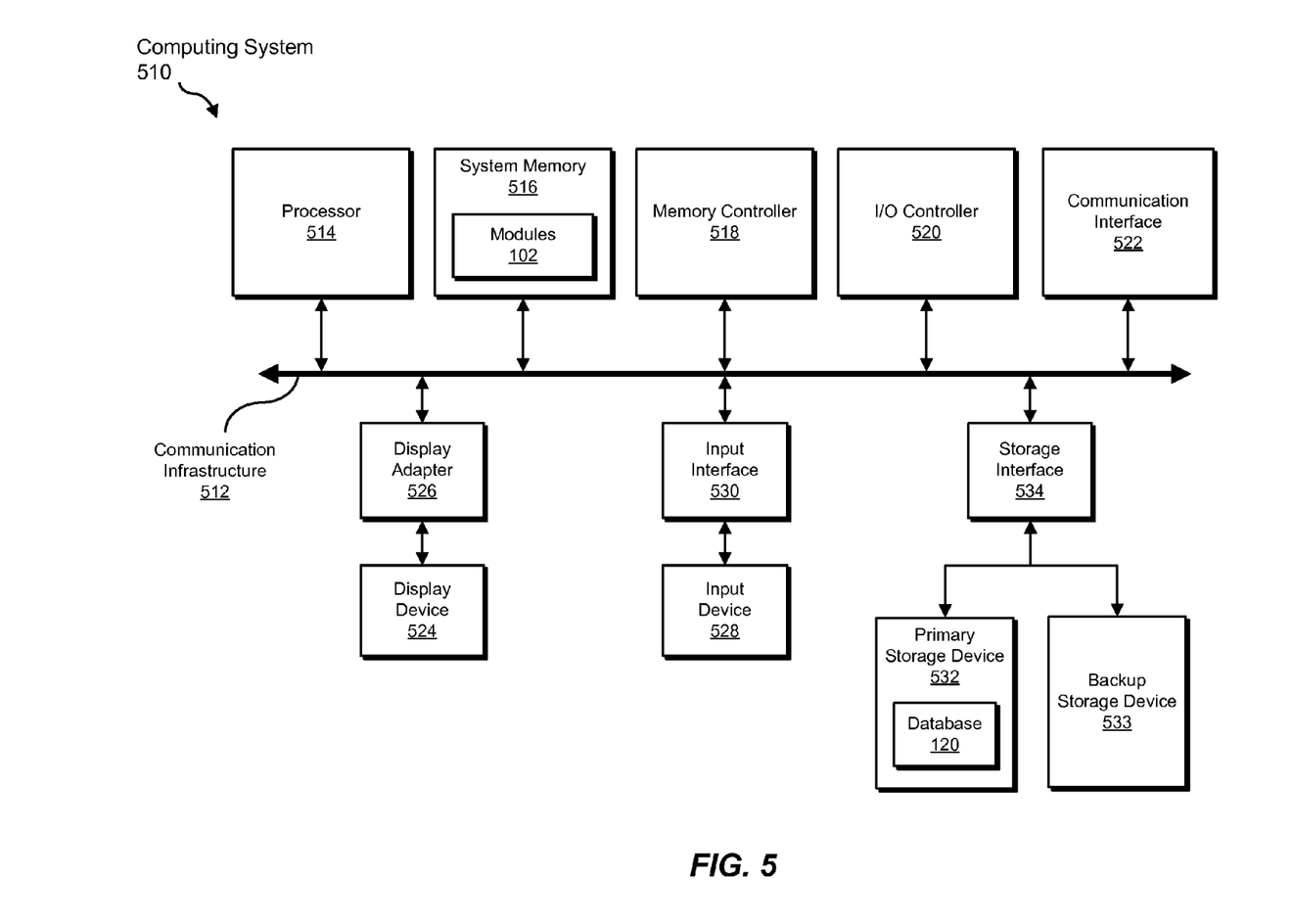
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the receiving, determining, analyzing, making, identifying, correlating, estimating, and normalizing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
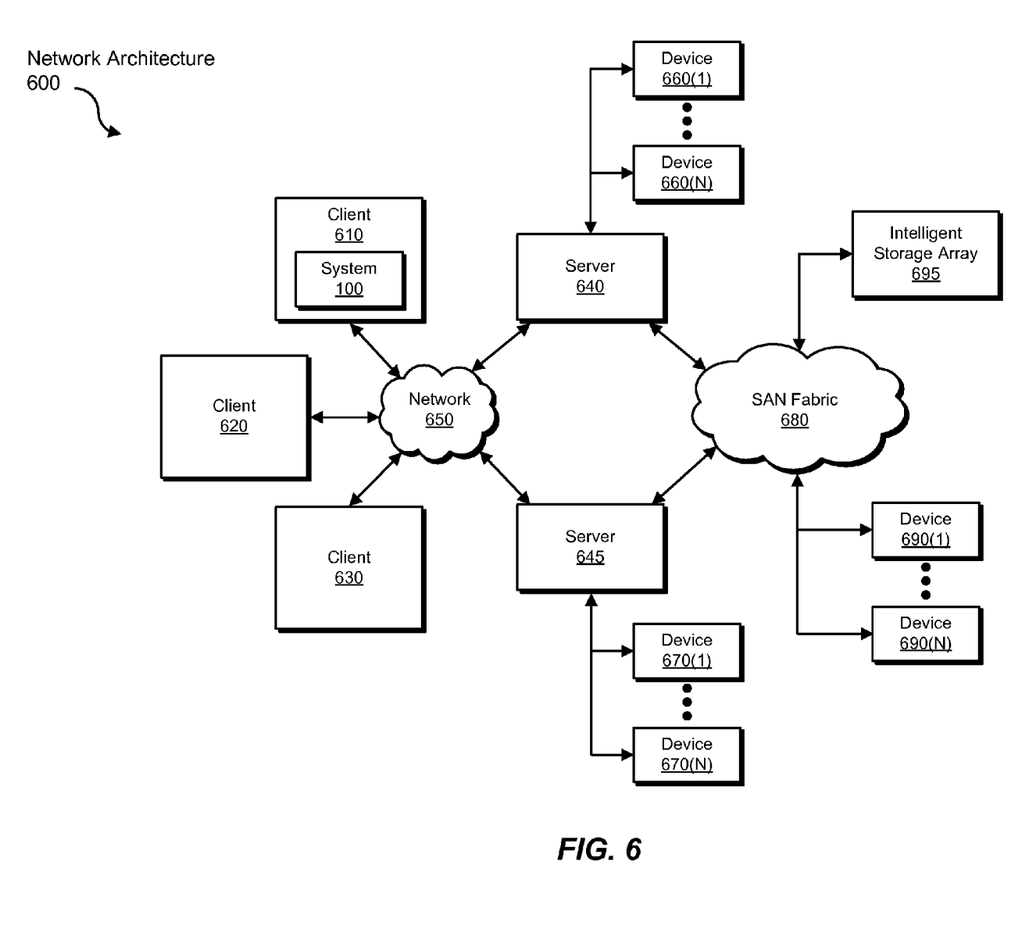
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the receiving, determining, analyzing, making, identifying, correlating, estimating, and normalizing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for determining malicious-attack exposure levels based on field-data analysis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a plurality of attack reports to be transformed, transform the plurality of attack reports into malicious-attack exposure levels of software components, output a result of the transformation to a security module that performs security determinations related to the software components, use the result of the transformation to make a security determination related to the software component, and store the result of the transformation to a database configured to store malicious-attack exposure levels. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining malicious-attack exposure levels based on field-data analysis, at least a portion of the method being performed by a computing device comprising at least one processor, the method comprising:
   receiving a plurality of attack reports from a plurality of computing systems, wherein at least one attack report within the plurality of attack reports comprises:
      an identifier of a software component of a computing system within the plurality of computing systems from which the attack report was received;
      an indication that a malicious attack was detected at the computing system from which the attack report was received;
   determining a number of attack reports within the plurality of attack reports that identify the software component;
   analyzing the plurality of attack reports to determine, based at least in part on the number of attack reports within the plurality of attack reports that identify the software component, a level of exposure to malicious attacks of the software component that reflects a portion of an attack surface of the software component that is actually attacked in the field;
   making, based at least in part on the level of exposure to malicious attacks of the software component, a security determination related to the software component.

2. The computer-implemented method of claim 1, wherein making the security determination related to the software component comprises:
   identifying an additional computing system on which the software component is installed;
   determining, based at least in part on the level of exposure to malicious attacks of the software component, a level of exposure to malicious attacks of the additional computing system.

3. The computer-implemented method of claim 1, wherein making the security determination related to the software component comprises:
   identifying a potential malicious attack at at least one additional computing system on which the software component is installed;
   determining, based at least in part on the level of exposure to malicious attacks of the software component, a level of threat of the potential malicious attack.

4. The computer-implemented method of claim 1, further comprising:
   correlating at least one property of the software component with the level of exposure to malicious attacks of the software component;
   making, based at least in part on correlating the property of the software component with the level of exposure to malicious attacks of the software component, a security determination related to the property of the software component.

5. The computer-implemented method of claim 4, wherein making the security determination related to the property of the software component comprises:
   identifying an additional software component with the property of the software component;
   estimating, based at least in part on correlating the property of the software component with the level of exposure to malicious attacks of the software component, the level of exposure to malicious attacks of the additional software component.

6. The computer-implemented method of claim 1, wherein:
   determining the number of attack reports within the plurality of attack reports that identify the software component comprises determining a number of attack reports within the plurality of attack reports that identify the software component and indicate that a malicious attack to which the software component is known to be vulnerable was detected;
   analyzing the plurality of attack reports to determine the level of exposure to malicious attacks of the software component is based at least in part on the number of attack reports within the plurality of attack reports that identify the software component and indicate that the malicious attack to which the software component is known to be vulnerable was detected.

7. The computer-implemented method of claim 1, wherein the level of exposure to malicious attacks of the software component reflects the portion of the attack surface of the software component that is actually attacked in the field by reflecting a portion of vulnerabilities of the software component that are actually attacked in the field.

8. The computer-implemented method of claim 1, wherein:
   determining the number of attack reports within the plurality of attack reports that identify the software component comprises determining a number of attack reports within the plurality of attack reports that identify the software component and indicate that a host-based malicious attack was detected;

analyzing the plurality of attack reports to determine the level of exposure to malicious attacks of the software component comprises analyzing the plurality of attack reports to determine, based at least in part on the number of attack reports within the plurality of attack reports that identify the software component and indicate that a host-based malicious attack was detected, a level of exposure to host-based malicious attacks of the software component.

9. The computer-implemented method of claim 1, further comprising normalizing, prior to analyzing the plurality of attack reports to determine the level of exposure to malicious attacks of the software component, the number of attack reports within the plurality of attack reports that identify the software component.

10. The computer-implemented method of claim 1, wherein the software component of the computing system comprises at least one of:
an operating system installed on the computing system;
an application installed on the computing system.

11. A system for determining malicious-attack exposure levels based on field-data analysis, the system comprising:
a receiving module programmed to receive a plurality of attack reports from a plurality of computing systems, wherein at least one attack report within the plurality of attack reports comprises:
an identifier of a software component of a computing system within the plurality of computing systems from which the attack report was received;
an indication that a malicious attack was detected at the computing system from which the attack report was received;
an analyzing module programmed to:
determine the number of attack reports within the plurality of attack reports that identify the software component;
analyze the plurality of attack reports to determine, based at least in part on the number of attack reports within the plurality of attack reports that identify the software component, a level of exposure to malicious attacks of the software component that reflects a portion of an attack surface of the software component that is actually attacked in the field;
a security module programmed to make, based at least in part on the level of exposure to malicious attacks of the software component, a security determination related to the software component;
at least one processor configured to execute the receiving module, the analyzing module, and the security module.

12. The system of claim 11, wherein the security module is programmed to make the security determination related to the software component by:
identifying an additional computing system on which the software component is installed;
determining, based at least in part on the level of exposure to malicious attacks of the software component, a level of exposure to malicious attacks of the additional computing system.

13. The system of claim 11, wherein the security module is programmed to make the security determination related to the software component by:
identifying a potential malicious attack at at least one additional computing system on which the software component is installed;
determining, based at least in part on the level of exposure to malicious attacks of the software component, a level of threat of the potential malicious attack.

14. The system of claim 11, wherein:
the analyzing module is further programmed to correlate at least one property of the software component with the level of exposure to malicious attacks of the software component;
the security module is further programmed to make, based at least in part on correlating the property of the software component with the level of exposure to malicious attacks of the software component, a security determination related to the property of the software component.

15. The system of claim 14, wherein the security module is programmed to make the security determination related to the property of the software component by:
identifying an additional software component with the property of the software component;
estimating, based at least in part on correlating the property of the software component with the level of exposure to malicious attacks of the software component, the level of exposure to malicious attacks of the additional software component.

16. The system of claim 11, wherein the analyzing module is programmed to:
determine the number of attack reports within the plurality of attack reports that identify the software component by determining a number of attack reports within the plurality of attack reports that identify the software component and indicate that a malicious attack to which the software component is known to be vulnerable was detected;
analyze the plurality of attack reports to determine the level of exposure to malicious attacks of the software component based at least in part on the number of attack reports within the plurality of attack reports that identify the software component and indicate that the malicious attack to which the software component is known to be vulnerable was detected.

17. The system of claim 11, wherein the analyzing module is programmed to:
determine the number of attack reports within the plurality of attack reports that identify the software component by determining a number of attack reports within the plurality of attack reports that identify the software component and indicate that a network-based malicious attack was detected;
analyze the plurality of attack reports to determine the level of exposure to malicious attacks of the software component by analyzing the plurality of attack reports to determine, based at least in part on the number of attack reports within the plurality of attack reports that identify the software component and indicate that a network-based malicious attack was detected, a level of exposure to network-based malicious attacks of the software component.

18. The system of claim 11, wherein the analyzing module is programmed to:
determine the number of attack reports within the plurality of attack reports that identify the software component by determining a number of attack reports within the plurality of attack reports that identify the software component and indicate that a host-based malicious attack was detected;
analyze the plurality of attack reports to determine the level of exposure to malicious attacks of the software component by analyzing the plurality of attack reports to determine, based at least in part on the number of attack reports within the plurality of attack reports that identify the software component and indicate that a host-based malicious attack was detected, a level of exposure to host-based malicious attacks of the software component.

19. The system of claim 11, wherein the software component of the computing system comprises at least one of:
   an operating system installed on the computing system;
   an application installed on the computing system.

20. A non-transitory computer-readable medium comprising one or more computer-executable instructions that, when executed by at least one processor of a computing device, cause the computing device to:
   receive a plurality of attack reports from a plurality of computing systems, wherein at least one attack report within the plurality of attack reports comprises:
      an identifier of a software component of a computing system within the plurality of computing systems from which the attack report was received;
      an indication that a malicious attack was detected at the computing system from which the attack report was received;
   determine a number of attack reports within the plurality of attack reports that identify the software component;
   analyze the plurality of attack reports to determine, based at least in part on the number of attack reports within the plurality of attack reports that identify the software component, a level of exposure to malicious attacks of the software component that reflects a portion of an attack surface of the software component that is actually attacked in the field;
   make, based at least in part on the level of exposure to malicious attacks of the software component, a security determination related to the software component.

* * * * *